Jan. 12, 1971 W. D. McALLISTER 3,554,621
COMBINATION CAGE AND SEAL FOR ANTIFRICTION BEARINGS
Filed Aug. 23, 1967 2 Sheets-Sheet 1
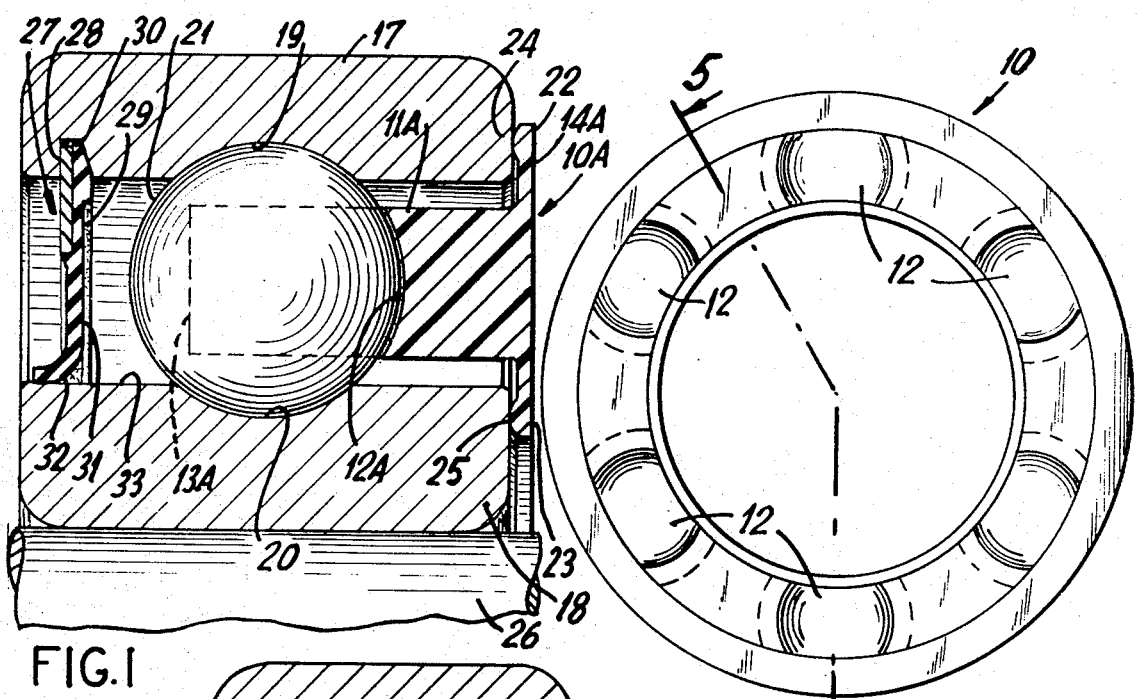
FIG.1
FIG.4
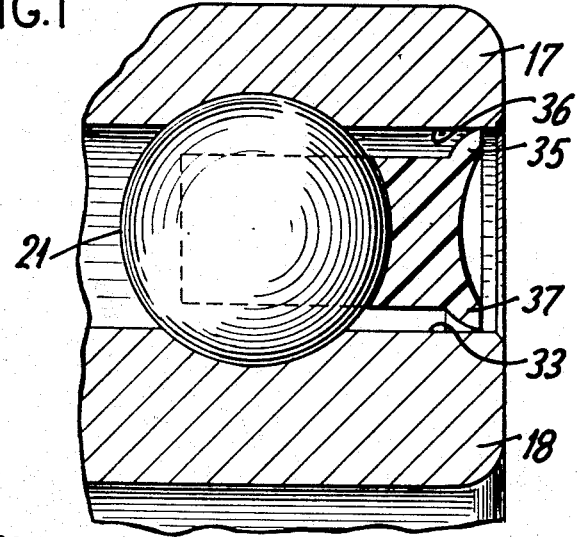
FIG.2
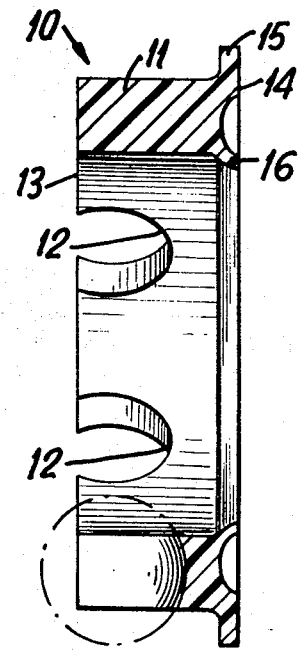
FIG.5
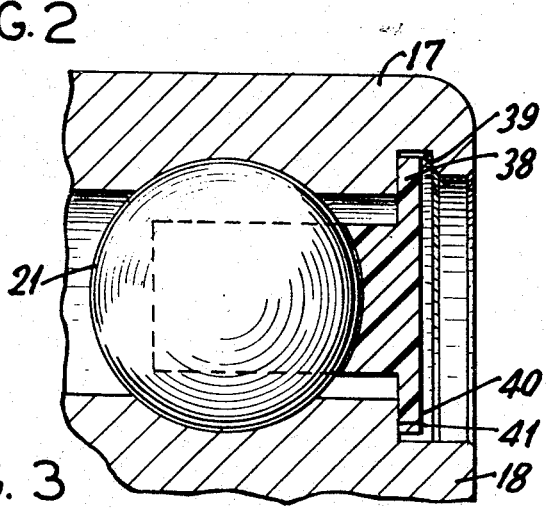
FIG.3
INVENTOR.
WILLIAM D. McALLISTER
BY
Eugene J. Kalil
ATTORNEY Jan. 12, 1971 W. D. McALLISTER 3,554,621
COMBINATION CAGE AND SEAL FOR ANTIFRICTION BEARINGS
Filed Aug. 23, 1967 2 Sheets-Sheet 2

INVENTOR.
WILLIAM D. McALLISTER
BY
Eugene J. Kalil
ATTORNEY

United States Patent Office 3,554,621
Patented Jan. 12, 1971

3,554,621
COMBINATION CAGE AND SEAL FOR
ANTIFRICTION BEARINGS
William D. McAllister, Poughkeepsie, N.Y., assignor to
The Federal Bearings Co., Inc., Poughkeepsie, N.Y.,
a corporation of New York
Filed Aug. 23, 1967, Ser. No. 662,678
Int. Cl. F16c 33/78
U.S. Cl. 308—187.2
2 Claims

ABSTRACT OF THE DISCLOSURE

A combination bearing cage and seal is provided for an antifriction bearing having inner and outer rings comprising an annular member having a tubular body portion of predetermined thickness to enable insertion of one end thereof into the annular space of the bearing, said one end of the tubular body having a plurality of ball pockets which may be spherical or cylindrical in shape disposed radially about said end, the pockets being formed so as to fit against the bearing balls. The other end of the tubular member has an enlarged flange portion for sealing off one side of the annular bearing space. The cage may advantageously be made of plastic including synthetic or natural rubber with a hard tubular portion, at least a portion of the flange being preferably resilient to provide sealing contact at the end face of the bearing. The cage may be molded with one or more metal inserts to add strength thereto.

---

This invention relates to an antifriction bearing assembly and, in particular, to a combination bearing cage and seal for an antifriction bearing having inner and outer rings, the cage being adapted via seal means integral therewith to close off one end of the bearing and inhibit the intrusion of dirt, moisture, corrosive fluids, and the like, through said end. The other end of the bearing may have a wiping seal well known in the art for closing off the bearing opening, or a two-piece annular cage may be employed, each provided with means for sealing off its respective end of the bearing.

Bearing cages or retainers are generally essential in the proper operation of ball bearings. They serve to space the balls evenly in the races of the inner and outer rings of the bearings, while permitting free operation of the bearing at all times. An example of a bearing cage is a pressed-steel type ring having spherically or cylindrically shape pockets spaced about the periphery thereof, a pair of the rings in opposed relationship being used to hold bearing balls therebetween, the rings, in one type, being held together by projecting tongues of metal which are bent upon themselves in order to hold the rings together. The cage travels with the balls, the annular opening on each side of the antifriction bearing being closed off by seals to prevent the intrusion of dust, moisture and the like, into the annular chamber occupied by the bearing balls.

It would be desirable to provide a bearing cage capable of being easily assembled into the annular space of a bearing and which has integral with it an annular flange member which autmoatically closes off one side face of the bearing when the cage is inserted into the bearing chamber.

It is thus the object of the invention to provide an antifriction bearing assembly having a bearing cage which serves also as a bearing seal.

Another object is to provide a bearing cage having the two-fold function of maintaining bearing balls in spaced apart relationship in a bearing and of sealing off one end face of the bearing.

A still further object is to provide a bearing cage of two-piece construction capable of providing a seal for both ends of a bearing.

These and other objects will more clearly appear when taken in conjunction with the following disclosure, claims and the accompanying drawing, wherein:

FIGS. 1 to 3 hsow, in fragmented cross section, several embodiments of the cage provided by the invention in cooperable relation with the inner and outer rings of an antirifriction bearing;

FIG. 4 depicts, in elevation, one embodiment of the bearing cage provided by the invention;

FIG. 5 is a partial section of the bearing cage taken along line 5—5 of FIG. 4;

Figure 6:
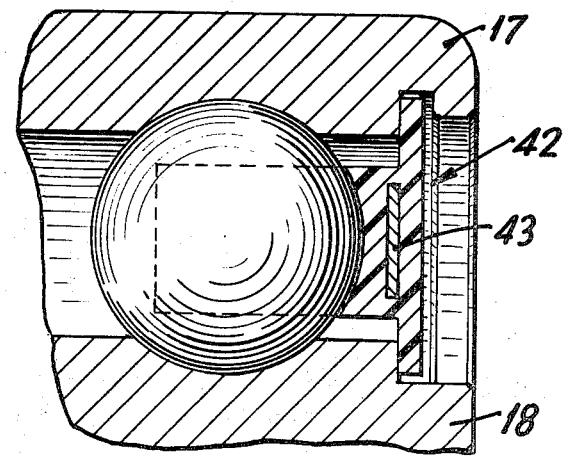
FIG. 6 is smiilar to FIG. 3 except that the cage has an annular metal insert molded therein.

Referring to FIGS. 4 and 5, one embodiment of the bearing cage provided by the invention is shown preferably and advantageously made of plastic, comprising an annular member 10 having an axially extending tubular body portion of predetermined thickness with a plurality of ball pockets 12 disposed radially about one end 13 thereof, the pockets being formed to fit against bearing balls and hold them in spaced apart relationship, the free end portion of the tubular body between the pockets being solid as shown. The other end of the tubular member has an enlarged flange 14, the annular width of the flange being sufficient to close off the annular chamber defined by the inner and outer rings of a bearing (note FIGS. 1 to 3).

The flange illustrated in the embodiment of FIG. 5 is shown as having an annular shoulder 15 extending radially outwardly for contacting an end face of the bearing, an annular seal-wiping portion 16 extending radially inwardly being provided for making contact with the surface of the inner ring. As stated above, the cage is advantageously made of plastic. The cage is designed so that the tubular body portion 11 is hard and the flange portion 14 is sealingly flexible. This can be achieved by employing certain thermosetting plastics, the thermosetting properties of which are controlled by methods well known in the art, whereby the tubular body portion may be selectively produced in the hardened condition, while the flanged seal portion is caused to remain somewhat flexible. As will be apparent to those skilled in the art, the whole cage may be somewhat hard with the flange portion mechanically designed so that it tends to be flexible so as to provide minimum amount of low pressure contact with the rings in order to keep frictional drag as low as possible.

Moldable plastics normally employed in the bearing field may be used. Such plastics, where desired, may be fabric-filled. The term "plastics" used herein is meant to include plastics per se as well as fabric-filled plastics and, in addition, synthetic and natural rubbers with or without fillers. Examples of plastics that may be employed include the polyamides, such as nylon, certain of the phenolics, acetal resins, polyester resins, polyurethane, and such thermoplastics as polyethylene and the like. Examples of synthetic rubbers are acrylic or polyacrylate rubbers, chlorosulfonated polyethylene and similar synthetics.

As stated hereinbefore, other embodiments of the novel cage provided by the invention are shown in FIGS. 1 to 3. Referring to FIG. 1, a bearing assembly is shown comprising outer and inner rings 17 and 18, respectively, of steel with raceways 19 and 20, respectively, on the surfaces thereof having bearing balls, e.g. ball 21, disposed in spaced-apart relationship between said raceways. Inner ring 18 is shown mounted on shaft 26. A ball-bearing cage 10A of plastic is depicted extending into the annular space defined by the bearing rings comprising tubular body portion 11A of predetermined thickness less than the annular space of the bearing but constituting the major width of the annular space as shown to enable insertion of the cage into the annular chamber of the bearing. Located inwardly from the free end 13A of the tubular body portion are a plurality of ball-receiving pockets 12A shown fitted against the balls, each of the pockets engaging each of the balls beyond its center, for example, over approximately two-thirds of its diameter, this configuration being advantageous in providing a snap fit with the balls. However, the pockets need not snap fit over the balls as will be apparent from other embodiments described herein.

As depicted in FIG. 1, the tubular body portion is flanged opposite its insertable end at 14A, the flange having outwardly and inwardly extending shoulders 22 and 23, respectively, with annular ridges 24, 25 bearing against the end faces of the bearing rings. Since the cage travels with the bearing balls, the purpose of the ridges is to insure as little wiping pressure as possible. As stated above, the shoulders of the flange are designed to be flexible to provide the necessary sealing action with the minimum friction possible.

The opposite side of the annular bearing chamber may be closed off with an annular seal 27 comprising, by way of example, a metal retaining ring 28 adhesively molded into the face of an elastomeric seal 29 of, for example, Buna N rubber, the seal having a radially extending portion 31 and being anchored at its periphery into seal-retaining groove 30 in the outer bearing ring. The radially extending portion terminates into a lip 32 flexed in wiping engagement with land 33 of inner bearing ring 18. Ths type of seal has the advantage in that it is firmly anchored in place under conditions which allow the seal to ride out an eccentricity which may exist in the bearing without any sacrifice in its sealing quality.

In FIG. 2, another form of cage is shown in which the flange is shaped so that it will flex into the annular space as shown, with annular shoulder 35 of the flange riding on land 36 of the outer ring near its end face and annular shoulder 37 riding on land 33 of the inner ring.

In FIG. 3, still another cage embodiment is shown in which the flange of the cage is designed so that projecting shoulder 38 is fitted into annular groove 39 at the end face of the outer ring with shoulder 40 riding against annular shoulder 41 of the end face of the inner ring, the flange closing off the annular chamber at substantially the end face of the bearing.

In situations where it is desired that the plastic cage be additionally strengthened, metal inserts may be molded into the cage. As illustrative of one embodiment, reference is made to FIG. 6 which shows a bearing cage 42 with an annular metal insert 43 molded therein.

Figure 7:
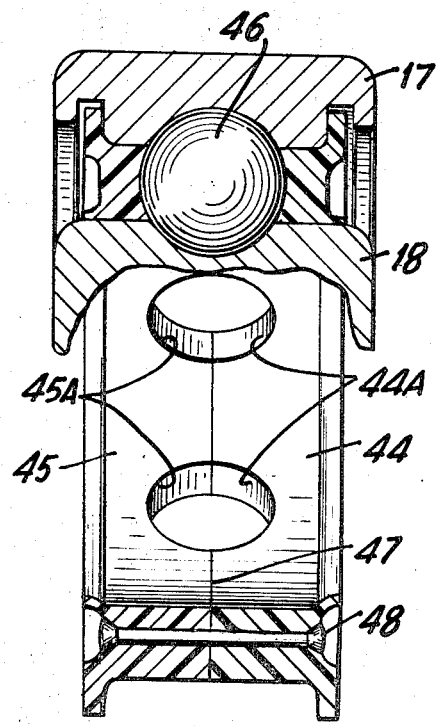
FIG. 7 depicts a fragment of a bearing assembly in which the combination bearing cage and seal is formed of two cage elements.

While FIGS. 1 to 5 are illustrative of a bearing cage made of a one-piece construction, a two-piece construction may be advantageously employed of the type shown in FIG. 7. There, two annular cage elements 44 and 45 are shown fitted into a bearing assembly depicted fragmentarily in partial section comprising outer and inner bearing rings 17 and 18, respectively, to the ends of which cage elements 44 and 45 are fitted, such that the respective pockets 44A and 45A of the cage elements fit in opposed relationship about the bearing balls, e.g. ball 46 shown in the upper portion of FIG. 7. The two-halves of the bearing cage may be held together by bonding at their contacting interface 47 by well known plastic or other adhesives, or held together mechanically by several fasteners or rivets 48 spaced radially about the cage.

An advantage of this embodiment is that the completed cage seals off both sides of the bearing.

Figure 8:
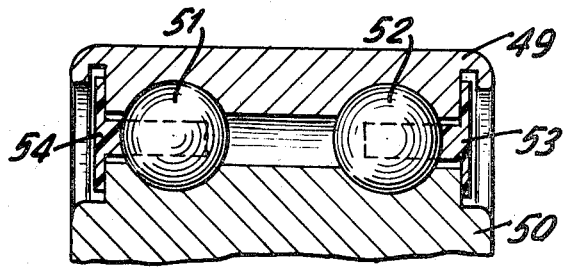
FIG. 8 is illustrative of a bearing with a double row of bearing balls held by two bearing cages of the invention.

Another useful embodiment is one in which two cages are employed in a bearing assembly utilizing two rows of bearing balls as shown in FIG. 8 wherein outer and inner bearing rings 49 and 50, respectively, have included in the annular space thereof two rows of bearing balls 51, 52 maintained in spaced relationship about the races in the annular chamber by flanged bearing cages 53 and 54. As will be apparent, the flanges of both cages seal off both ends of the bearing as described hereinbefore for FIGS. 1 to 3.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An antifriction bearing comprising inner and outer rings defining an annular bearing chamber having raceways with balls disposed therebetween, said antifriction bearing also including a one-piece combination bearing cage and seal in the form of a plastic annular member having a hard axially extending tubular body portion of predetermined thickness with its free end inserted from one face of said bearing into the annular chamber thereof, said predetermined thickness constituting the major width of the annular chamber, a plurality of ball-receiving pockets disposed radially about the free end of said tubular body portion in engagement with said bearing balls, each of the pockets engaging each of the balls beyond the ball center thereof, the amount of engagement being less than the ball diameter and approximately two-thirds of the ball diameter, whereby to provide a snap fit with each of the balls, the free end portion of the tubular body being solid between the pockets, inner and outer radially extending flexible flanges at the opposite end of said tubular body portion, the radially extending portions thereof sealing off the annular chamber between the inner and outer rings at said end face of said bearing, said flexible flanges being relatively resilient compared to the hard tubular portion, and an annular seal closing off the opposite end face of the annular member.

2. The antifriction bearing of claim 1, wherein at least one of said radially extending flanges occupies an annular groove of one of the rings at the end face thereof.

References Cited

UNITED STATES PATENTS

| 980,101 | 12/1910 | Hess | 308—187.2 |
|---|---|---|---|
| 3,011,841 | 12/1961 | Moyer | 308—187.1 |
| 3,113,812 | 12/1963 | Dotter | 308—201X |
| 3,135,564 | 6/1964 | Agens | 308N |

FOREIGN PATENTS

| 1,327,643 | 12/1963 | France | 308—187.2 |
|---|---|---|---|
| 615,107 | 1/1949 | Great Britain | 308—187.2 |
| 1,201,927 | 1/1967 | France | 308—217 |
| 227,605 | 5/1960 | Australia | 308N |
| 1,104,870 | 11/1955 | France | 308N |
| 833,847 | 5/1960 | Great Britain | 308N |
| 1,466,935 | 1/1967 | France | 308—187.2 |
| 615,107 | 1/1949 | Great Britain | 308—1872. |

OTHER REFERENCES

German printed application 1,030,629, May, 1958.

FRED C. MATTERN, JR., Primary Examiner

F. SUSKO, Assistant Examiner